United States Patent
Lin et al.

(10) Patent No.: US 11,539,215 B2
(45) Date of Patent: Dec. 27, 2022

(54) VOLTAGE CONTROL INVERTER, POWER SOURCE APPARATUS, AND CONTROL METHOD

(71) Applicant: KABUSHIKI KAISHA TOSHIBA, Tokyo (JP)

(72) Inventors: Qiang Lin, Kawasaki Kanagawa (JP); Hiroshi Uno, Kawasaki Kanagawa (JP); Yasuhiro Kanekiyo, Yokohama Kanagawa (JP); Tetsu Shijo, Setagaya Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/467,407

(22) Filed: Sep. 6, 2021

(65) Prior Publication Data
US 2022/0302707 A1   Sep. 22, 2022

(30) Foreign Application Priority Data
Mar. 16, 2021   (JP) .............................. JP2021-042662

(51) Int. Cl.
H02J 3/38   (2006.01)
H02M 7/493   (2007.01)

(52) U.S. Cl.
CPC .............. *H02J 3/381* (2013.01); *H02M 7/493* (2013.01); *H02J 2300/24* (2020.01); *H02J 2300/28* (2020.01)

(58) Field of Classification Search
CPC .......... H02J 3/38; H02J 3/381; H02J 2300/28; H02J 2300/24; H02M 7/493
See application file for complete search history.

(56) References Cited

FOREIGN PATENT DOCUMENTS

| | | |
|---|---|---|
| JP | S59-56995 A | 4/1984 |
| JP | S59-181926 A | 10/1984 |
| JP | H1-16359 A | 5/1989 |
| JP | H5-15140 A | 2/1993 |
| JP | 2004-282948 A | 10/2004 |
| JP | 2005-198373 A | 7/2005 |
| JP | 4337438 B2 | 9/2009 |
| JP | 2011-120396 A | 6/2011 |
| JP | 5045053 B2 | 10/2012 |
| JP | 6093283 B2 | 3/2017 |

OTHER PUBLICATIONS

Kenichi Sakimoto, "Research on virtual synchronous generator control applies to inverter-connected distributed power sources," Osaka University Knowledge Archive (OUKA), DOI: 10.18910/52161, 108 pages (2015).

Yasuhiro Noro, "Proposal of Inverter Control Method for Electric Power System Consisting of Energy Storages," IEEJ Transactions on Power and Energy, vol. 138, No. 11, pp. 854-861 (2018)).

*Primary Examiner* — Robert L Deberadinis
(74) *Attorney, Agent, or Firm* — Finnegan, Henderson, Farabow, Garrett & Dunner, LLP

(57) ABSTRACT

According to one embodiment, a voltage control inverter interconnectable with an electric power system, includes: a voltage detecting circuit configured to detect a first voltage that is a voltage of the electric power system; and a voltage output circuit configured to output a second voltage to the electric power system at a timing depending on a value of the first voltage, the second voltage having a value depending on the value of the first voltage.

23 Claims, 11 Drawing Sheets

VOLTAGE CONTROL INVERTER, POWER SOURCE APPARATUS, AND CONTROL METHOD

CROSS REFERENCE TO RELATED APPLICATIONS

This application is based upon and claims the benefit of priority from the prior Japanese Patent Application No. 2021-042662, filed on Mar. 16, 2021, the entire contents of which are incorporated herein by reference.

FIELD

Embodiments described herein relates to a voltage control inverter, a power source apparatus, and a control method.

BACKGROUND

A voltage control inverter operates as a voltage source and controls an output voltage based on drooping characteristics for an electric power system frequency, an electric power system voltage, or both of them, thereby keeping the frequency of the electric power system.

In causing the voltage control inverter to start operating in the electric power system, it is desirable that the magnitude, phase, and frequency of a voltage to be outputted from the inverter match those of the electric power system. Without matching, a high current would flow in response to the inverter being connected to the electric power system. In order to prevent this, there is also proposed a voltage control inverter provided with a synchronous entry function. In this voltage control inverter, with a main contactor (MC), which is a switch for connection to the electric power system, turned off, a control is performed to cause the amplitude and frequency of the voltage at a switching element (an inverter element) of the inverter to match those of the electric power system. In response to matching of the amplitude and frequency, the main contactor is turned on at the timing when the phase of the voltage matches. This configuration requires respective sensors that detect voltages on a side of the electric power system relative to the main contactor and the opposite side thereto.

DETAILED DESCRIPTION

According to one embodiment, a voltage control inverter interconnectable with an electric power system, includes: a voltage detecting circuit configured to detect a first voltage that is a voltage of the electric power system; and a voltage output circuit configured to output a second voltage to the electric power system at a timing depending on a value of the first voltage, the second voltage having a value depending on the value of the first voltage. Hereinafter, description will be made on an embodiment of the present invention with reference to the drawings.

Figure 1:
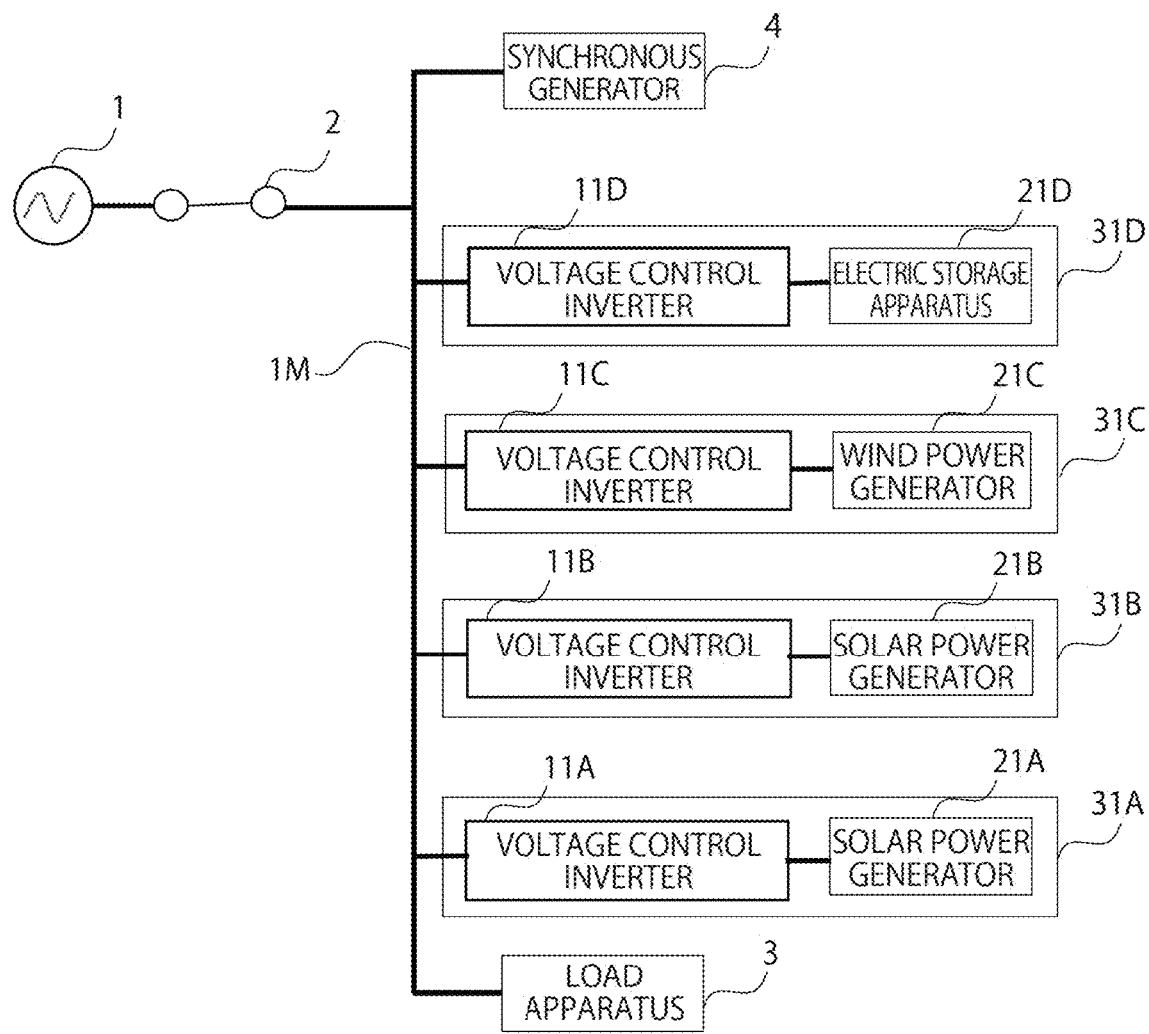
FIG. 1 illustrates an overall configuration of an electric power system according to the present embodiment.

FIG. 1 illustrates an overall configuration of an electric power system according to the present embodiment. An electric power system 1 is connected through a breaker 2 to power source apparatuses 31A, 31B, 31C, and 31D (31A to 31D), a load apparatus 3, and a synchronous generator 4. The power source apparatuses 31A to 31D include voltage control inverters 11A, 11B, 11C, and 11D (11A to 11D) and power supply apparatuses 21A, 21B, 21C, and 21D (21A to 21D) connected to the voltage control inverters 11A to 11D, respectively. The voltage control inverter is also referred to as a PCS (PCS: Power Conditioning System) or a power conversion apparatus. The power source apparatuses 31A to 31D may be connected to the electric power system 1 through a transformer. The transformer may be disposed between the electric power system 1 and the breaker 2.

The power supply apparatuses 21A and 21B are solar power generators (PV apparatuses), the power supply apparatus 21C is a wind power generator, and the power supply apparatus 21D is a chargeable/dischargeable secondary battery, or storage battery (electric storage apparatus).

Within the electric power system 1, a partial system connected to the power source apparatuses 31A to 31D, the load apparatus 3, and the synchronous generator 4 is a microgrid 1M. The microgrid 1M is a part of the electric power system 1.

Out of the power source apparatuses 31A to 31D, a power source apparatus is referred to as a power source apparatus 31. In addition, the voltage control inverter in the power source apparatus 31 is referred to as a voltage control inverter 11. The power supply apparatus in the power source apparatus 31 is referred to as a power supply apparatus 21.

The voltage control inverters 11A to 11D convert an electric power supplied from the solar power generators 21A and 21B, the wind power generator 21C, and the electric storage apparatus 21D to an alternating current, respectively, thereby generating an electric power for use by the load apparatus 3. The voltage control inverters 11A to 11D are each a voltage control inverter according to the present embodiment. It should be noted that at least one of the voltage control inverters 11A to 11D may be the voltage control inverter according to the present embodiment, whereas the others may be existing voltage control inverters. The solar power generator and the wind power generator are examples of natural energy power generators using sunlight and wind power as a natural energy and a power generator using any other natural energy such as a tidal power or a water power is also usable.

The load apparatus 3 is an apparatus that consumes an electric power at home, a school, a factory, a company, or the like, a storage battery that stores a redundant electric power in the electric power system 1, or the like. Although only the single load apparatus 3 is illustrated in the figure, there may be a plurality of load apparatuses 3. The power source apparatus 31 may be connected to the electric power system 1 through a transformer.

During a normal operation, for example, in a case where there is no abnormality such as an accident in the electric power system 1, the breaker 2 is closed. With the breaker 2 closed, an electric power is outputted from the solar power generators 21A and 21B and the wind power generator 21C through the respective voltage control inverters 11A to 11D connected thereto to the microgrid 1M (or the electric power system 1). The outputted electric power is supplied to the load apparatus 3. The electric power supplied from at least one of the solar power generator 21A, the solar power generator 21B, and the wind power generator 21C may be supplied to the storage battery 21D and stored. The electric power may be discharged from the storage battery 21D to be supplied to the load apparatus 3.

In the case of occurrence of an abnormality such as accident in the electric power system 1 or during a work or an emergency such a fire, the breaker 2 is opened, causing the microgrid 1M to be electrically disconnected (cut off) from the electric power system 1. With the microgrid 1M electrically disconnected from the electric power system 1, a worker stops the operations of the power source apparatuses. Alternatively, the power source apparatuses detect the disconnection, thus autonomously stop operating. The synchronous generator 4 is caused to start running in response to an instruction from the worker after the microgrid 1M is cut off from the electric power system 1. The synchronous generator 4 caused to start running generates and provides an alternating-current power to the microgrid 1M. The synchronous generator 4 is an alternating-current power generator including an emergency power generator, a continuous power generator, or both of them. In the microgrid 1M, the power source apparatuses restart operating after the activation of the synchronous generator 4, outputting an electric power to the microgrid 1M. While disconnected from the electric power system 1, the microgrid 1M autonomously functions as a distributed power source system.

The present embodiment relates to an operation for synchronously connecting the power source apparatus 31 to the microgrid 1M with an electric power supplied to the microgrid 1M from the electric power system 1 or an electric power supplied to the microgrid 1M from the synchronous generator 4. Connecting the power source apparatus 31 includes not only restarting an operation of the power source apparatus 31, which is currently out of operation, but also adding a new power source apparatus not illustrated in FIG. 1 to the microgrid 1M and causing the power source apparatus to start operating. To connect the power source apparatus 31 to the microgrid 1M, in the present embodiment, an operation of the voltage control inverter in the power source apparatus 31 is started (for example, activated) in synchronization with a phase of a voltage in the microgrid 1M or the electric power system 1. In other words, the operation of the voltage control inverter is started with a phase of an output voltage of the voltage control inverter synchronized with that of the microgrid 1M. This results in a reduction in the occurrence of a high current in the microgrid 1M. Further, in the present embodiment, the operation of the voltage control inverter is started with at least one of the frequency of the voltage and the amplitude of the voltage synchronized with the frequency of the voltage and the amplitude of the voltage in the microgrid 1M, thereby further enhancing an effect in reducing the occurrence of a high current. Connecting the power source apparatus 31 to the microgrid 1M is possible irrespective of whether the microgrid 1M is connected to the electric power system 1 or the microgrid 1M receives an electric power from the synchronous generator 4 with the breaker 2 opened. In a case where the microgrid 1M is connected to the electric power system 1, connecting the voltage control inverter to the microgrid 1M means the same as connecting the voltage control inverter to the electric power system 1.

Figure 2:
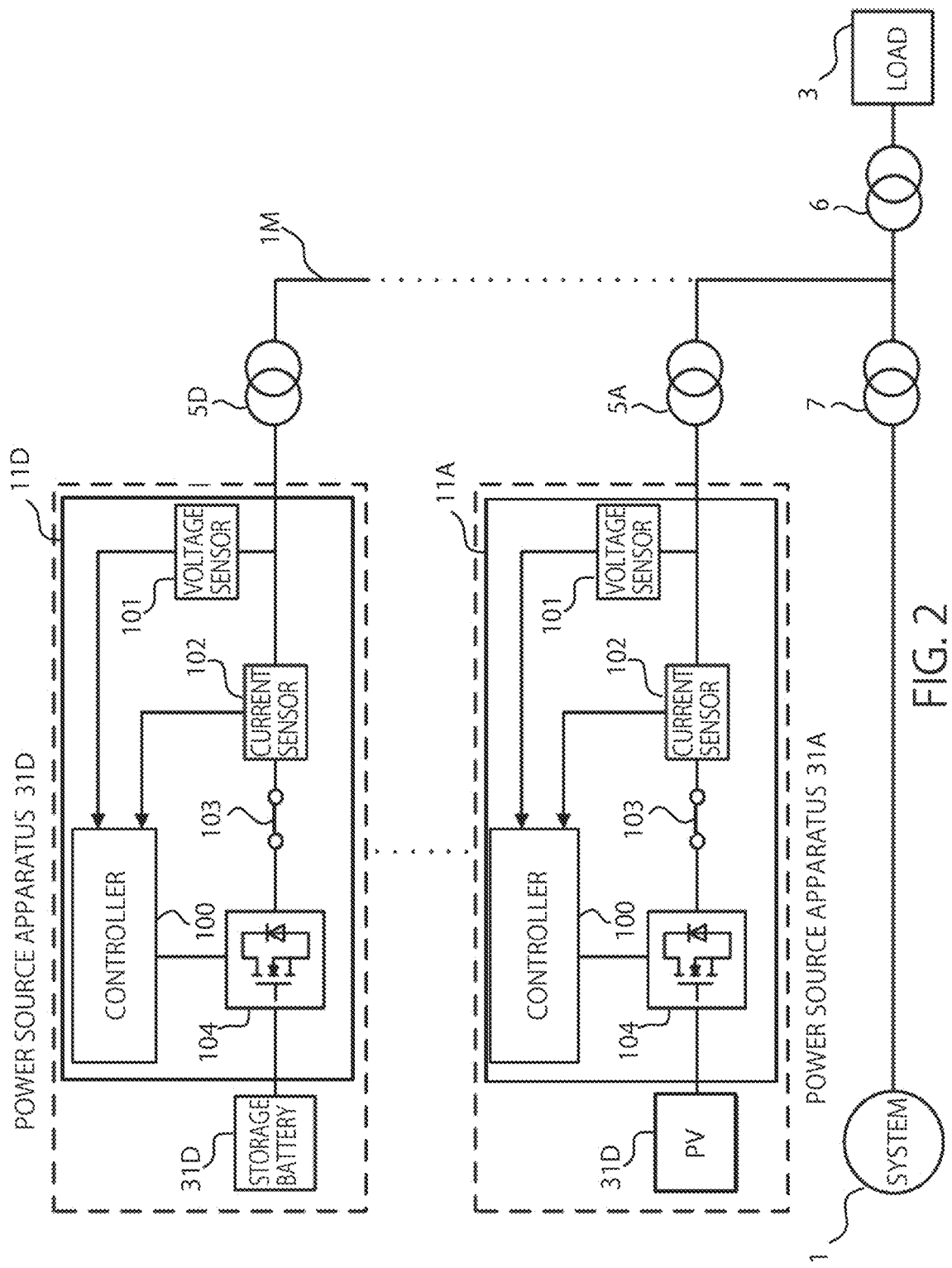
FIG. 2 illustrates a detailed block diagram of a power source apparatus.

FIG. 2 is a detailed block diagram of the power source apparatus 31. While the block diagram of each of the power source apparatuses 31A and 31D is illustrated in the figure, the power source apparatuses 31B, 31C likewise each have a similar configuration except a configuration of the power supply apparatus connected to the voltage control inverter. The same reference signs are used to refer to components having the same names in the blocks of the power source apparatuses.

The power source apparatuses 31A to 31D are connected to the electric power system 1 or the microgrid 1M (hereinafter, the electric power system 1, collectively) through transformers 5A to 5D, respectively. Out of the transformers 5A to 5D, a transformer connected to the power source apparatus 31 (one of the power source apparatuses 31A to 31D) is referred to as a transformer 5. The load apparatus 3 is connected to the electric power system 1 through a transformer 6. The electric power system 1 is connected to the electric power system 1 through a transformer 7.

The power source apparatus 31 (one of the power source apparatuses 31A to 31D) includes a controller (control circuit) 100, a voltage sensor 101 (voltage detecting circuit), a current sensor 102 (current detecting circuit), a main contactor (MC) 103 serving as a switch, and an inverter circuit 104 serving as a voltage output device (voltage output circuit).

The voltage sensor 101 detects a voltage in the electric power system 1 at regular sampling intervals. Specifically, the voltage sensor 101 detects a voltage between an output end of the voltage control inverter 11 and the transformer 5 as the voltage in the electric power system 1. The voltage in the electric power system 1 is a voltage of an alternating-current signal.

The current sensor 102 detects a current in the electric power system 1 at regular sampling intervals. Specifically, the current sensor 102 detects a current at an output end of the power source apparatus 31 as the current in the electric power system 1. The current in the electric power system 1 is a current of the alternating-current signal. It should be noted that a configuration including no current sensor 102 is acceptable.

The inverter circuit 104 generates, in response to a control signal inputted from the controller 100, an alternating-current voltage (or an alternating-current power) using an electric power (a direct-current power) supplied from the power supply apparatus 21. The inverter circuit 104 includes, by way of example, a plurality of switching devices (switching elements) such as IGBTs (Insulated Gate Bipolar Transistors). The ON and OFF of the switching devices is controlled by supplying the control signal for driving to control terminals (gate terminals) of the plurality of switching devices, which causes the inverter circuit 104 to generate an alternating-current voltage with desired phase, frequency, and amplitude. The control signal is, by way of example but not limited to, a PWM (Pulse Width Modulation) signal. In an out-of-operation state of the inverter circuit 104, the control terminals (gate terminals) of the plurality of switching devices are all turned off. This state is referred to as a gate block state.

The main contactor 103 is disposed between the inverter circuit 104 and the electric power system 1 (or the microgrid 1M). The main contactor 103 is a switch that can be turned on and off by the controller 100. To disconnect the power source apparatus 31 from the electric power system 1, the main contactor 103 is turned off. In order to synchronously connect the power source apparatus 31, which is out of operation, to the electric power system 1, the main contactor 103 is turned on in advance and a process for synchronously connecting the power source apparatus 31 to the electric power system 1 (a process to generate a control signal for synchronous connection) is started. It should be noted that a configuration where the main contactor 103 is turned off during the process and is turned on by the start of output of a voltage signal from the inverter circuit 104 is not excluded.

The controller 100 controls the operation of the power source apparatus 31. The controller 100 performs the process for synchronously connecting the voltage control inverter 11, which is out of operation, to the electric power system 1. An example of the process for synchronously connecting the voltage control inverter 11 to the electric power system 1 will be described below. The controller 100 turns on the main contactor 103 in advance.

[Phase Initialization Control]

The controller 100 detects a timing at which a detection voltage in the electric power system 1 crosses a voltage for reference (a phase reference voltage) at which a phase of the detection voltage is inverted, i.e., a sign of the detection voltage is switched from positive to negative or negative to positive. The voltage for reference is, by way of example, 0 [V]. The controller 100 controls an operation (driving) of the inverter circuit 104 to cause the inverter circuit 104, which is out of operation, to start voltage output at the detected timing. Specifically, the supply of the control signal for driving (the PWM signal) to the control terminals (gate terminals) of the plurality of switching devices of the inverter circuit 104 is started such that the output voltage starts from a voltage of 0 [V]. In other words, the voltage is outputted at start from a value depending on a value of the voltage for reference for phase switching (0 [V] or a value within an allowable error range relative to 0 [V]). The frequency and amplitude of the output voltage are predetermined frequency for reference (a reference frequency or a third frequency) and amplitude for reference (a reference amplitude or a third amplitude). In the inverter circuit 104 to which the control signal is supplied, gate block is cancelled and the output of an alternating-current voltage is started. The alternating-current voltage to be outputted is an alternating-current voltage with a voltage value that starts from the same as the voltage in the electric power system 1 (for example, 0 [V]) and frequency and amplitude that are the same as the reference frequency and the reference amplitude. In this case, although the amplitude and frequency of the alternating-current voltage to be outputted from the inverter circuit 104 can be different from the actual amplitude and frequency of the voltage in the electric power system 1, it is possible to start voltage output with the phase of the alternating-current voltage caused to match the actual phase of the voltage in the electric power system 1. In other words, it is possible to start voltage output with the phase of the alternating-current voltage synchronized with the phase of the voltage in the electric power system 1. This makes it possible to reduce the occurrence of overcurrent in the electric power system 1 attributed to mismatch between the phases at the start of the operation of the inverter circuit 104. The phase of the alternating-current voltage to be outputted from the voltage control inverter 11 being synchronized with the phase of the voltage in the electric power system 1 means that both phases match or a phase difference falls within a predetermined allowable error range.

[Frequency Initialization Control]

The controller 100 may perform a control to output a voltage signal not only synchronized in phase with the electric power system 1 but also synchronized in frequency with the electric power system 1. A frequency being synchronized means that the frequencies match or a frequency difference falls within a predetermined allowable error range.

Figure 3:
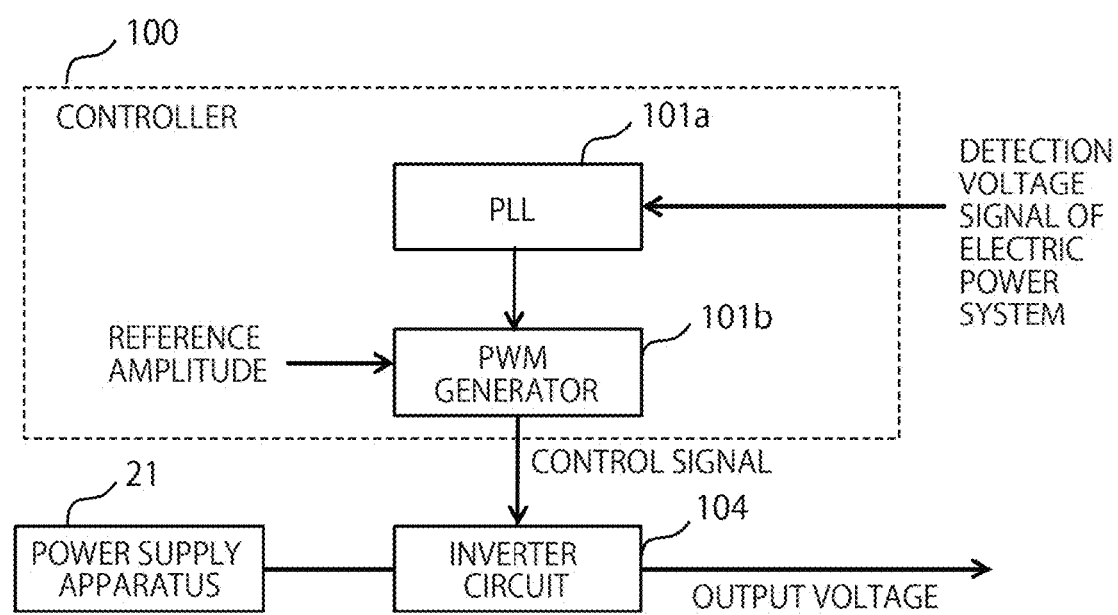
FIG. 3 illustrates an example of a configuration of a controller for outputting a voltage signal synchronized with the phase and frequency of the electric power system.

FIG. 3 illustrates an example of a configuration of the controller 100 for outputting a voltage signal synchronized with the phase and frequency of the electric power system 1. The controller 100 includes a PLL (Phase Locked Loop) and a PWM generator 101b. The PLL 101a corresponds to a frequency detector (frequency detecting circuit). The PLL 101a receives a signal of a voltage detected by the voltage sensor 101 and detects the phase (a first phase) and frequency (a first frequency) of the signal. The PLL 101a generates a first command signal indicating a second phase and a second frequency depending on the detected phase and frequency and outputs the first command signal to the PWM generator 101b. The second phase and the second frequency are values that match the first phase and the first frequency or fall within the respective allowable error ranges. A second command signal indicating a predetermined reference amplitude is inputted to the PWM generator 101b. The PWM generator 101b generates a control signal (a PWM signal) for the switching devices for causing an output voltage with the phase and frequency indicated by the first command signal and the amplitude indicated by the second command signal to be outputted from the inverter circuit 104. The PWM generator 101b supplies the generated control signal to the inverter circuit 104, causing the operation of the inverter circuit 104 to be started (causing gate block to be cancelled). This makes it possible to start the output of a voltage signal with phase and frequency that match or are close to the actual phase and frequency of the voltage in the electric power system 1. Therefore, it is possible to reduce the occurrence of overcurrent in the electric power system 1 at the start of the operation of the inverter circuit 104. In addition, after the start of output, the controller 100 may perform a control to keep the phase and frequency of the output voltage of the voltage control inverter 11 at the phase and frequency of the electric power system 1. Further, after the start of output, the controller 100 may perform a control to change the active power of the voltage control inverter from zero to a first value desired to be outputted in a slope. Specifically, for example, it may be performed by changing a frequency indicating a control signal for changing the active power to the PWM generator 101b. The above-described control may be achieved by calculating the electric power by using the current sensor 102 and the voltage sensor 101 and performing a feedback control. The first value may be informed by a control command from an EMS 10 or stored in advance in a storage of the voltage control inverter.

[Amplitude Initialization Control]

The controller 100 may further perform a control to output a voltage signal not only synchronized in phase and frequency with the electric power system 1 but also synchronized in voltage amplitude with the electric power system 1. An amplitude being synchronized means that the amplitude matches or an amplitude difference falls within a predetermined allowable error range.

Figure 4:
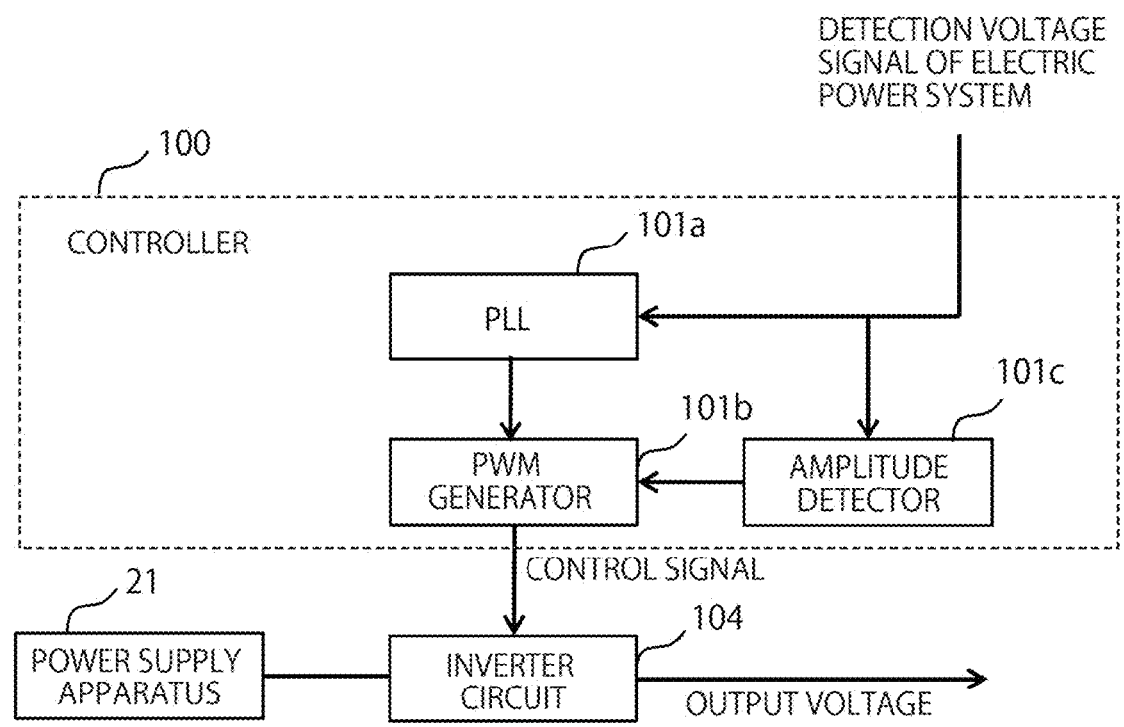
FIG. 4 illustrates an example of a configuration of a controller for outputting a voltage signal synchronized with the phase, frequency, and amplitude of the electric power system.

FIG. 4 illustrates an example of a configuration of the controller 100 for outputting a voltage signal synchronized with the phase, frequency, and amplitude of the electric power system 1. The controller 100 includes a PLL 101a, the PWM generator 101b, and an amplitude synchronization circuit (amplitude detector or amplitude detecting circuit) 101c. The PLL 101a receives a signal of a voltage detected by the voltage sensor 101 and detects the phase (a first phase) and frequency (a first frequency) of the signal. The PLL 101a generates a first command signal indicating a second phase and a second frequency depending on the detected phase and frequency and outputs the first command signal to the PWM generator 101b. The second phase and the second frequency are values that match the first phase and the first frequency or fall within the respective allowable error ranges. The amplitude synchronization circuit 101c detects the amplitude of the voltage (the maximum value of the absolute value of the voltage) detected by the voltage sensor 101 as a first amplitude and outputs a third command signal indicating a second amplitude depending on the detected amplitude to the PWM generator 101b. The second amplitude is a value that matches the first amplitude or falls within an allowable error range. The PWM generator 101b generates a control signal (a PWM signal) for the switching devices for causing a voltage signal with the phase and frequency indicated by the first command signal and the amplitude indicated by the third command signal to be outputted from the inverter circuit 104. The PWM generator 101b supplies the generated control signal to the inverter circuit 104, causing the operation of the inverter circuit 104 to be started (causing gate block to be canceled). This makes it possible to start the output of the voltage signal having phase, frequency, and amplitude that match or are close to the actual phase, frequency, and amplitude of the voltage of the electric power system 1, allowing for further reliably preventing the occurrence of overcurrent in the electric power system 1 at the time of the start of the operation of the inverter circuit 104. In addition, after the start of output, the controller 100 may perform a control to keep the phase, frequency, and the amplitude of the output voltage at the phase, frequency, and amplitude of the electric power system 1. Further, after the start of output, the controller 100 may perform a control to change the active power of the voltage control inverter from zero to the first value desired to be outputted in a slope. Specifically, for example, it may be performed by changing a frequency indicating a control signal for changing the active power to the PWM generator 101b. The above-described control may be achieved by calculating the electric power by using the current sensor 102 and the voltage sensor 101 and performing a feedback control. The first value may be informed by a control command from the EMS 10 or stored in advance in the storage of the voltage control inverter.

[Adjustment Control of Frequency and Amplitude]

After the start of the output of the voltage signal synchronized with the phase of the voltage, the frequency of the voltage, and the amplitude of the voltage of the electric power system 1, the controller 100 may perform an operation to gradually (with a constant inclination) return the frequency and amplitude of the voltage signal to be outputted to the reference frequency and the reference amplitude. After returning the frequency and amplitude of the output voltage to the reference frequency and the reference amplitude, the controller 100 may perform a control to keep the reference frequency and the reference amplitude.

Figure 5:
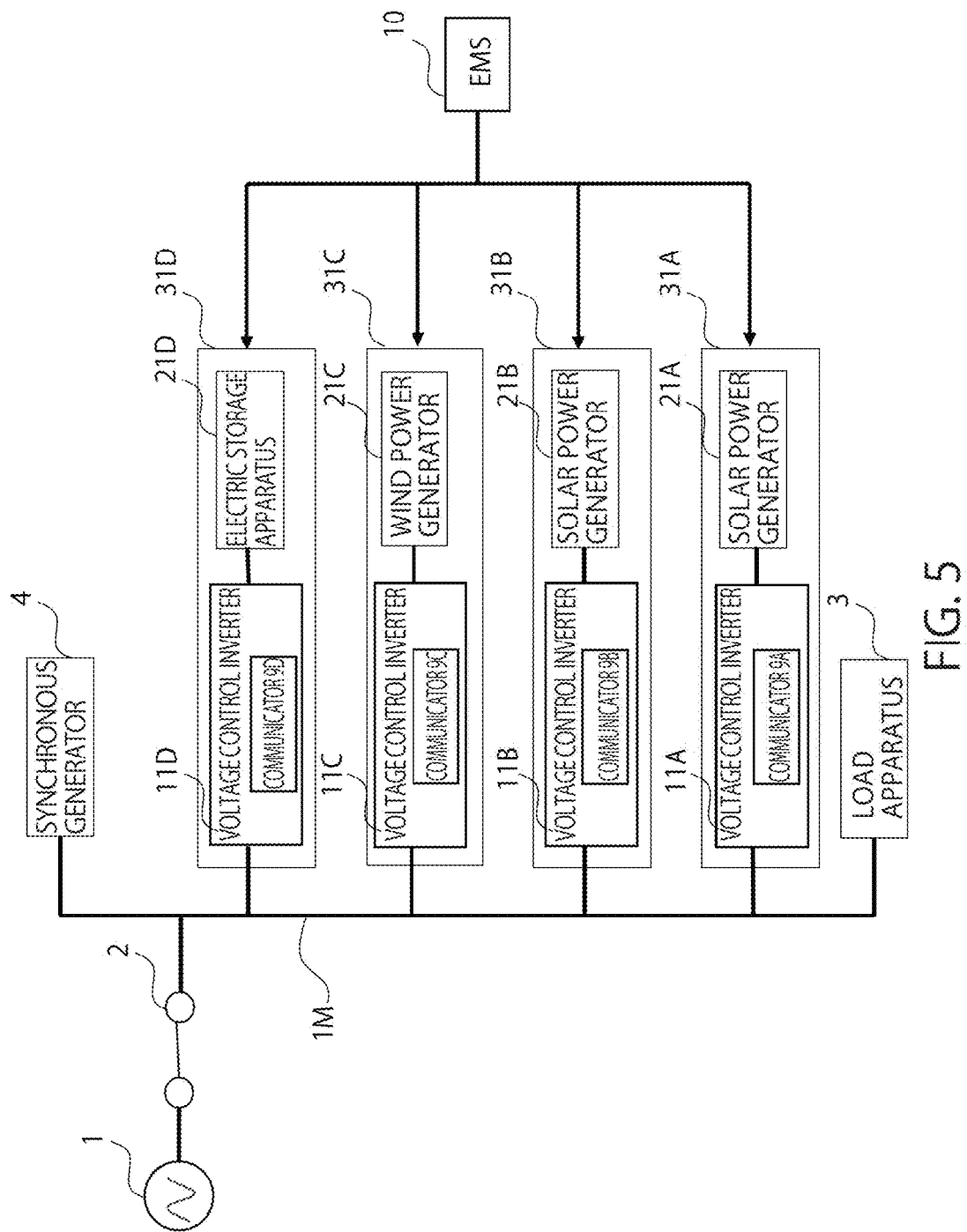
FIG. 5 illustrates an example of a system configuration in which the power source apparatus communicates with an EMS.

As described above, although the voltage signal the phase, frequency, and amplitude of which are synchronized with those of the electric power system 1 is outputted at the time of the activation of the inverter circuit 104 in order to prevent the occurrence of overcurrent, the operation to return the frequency and amplitude of the voltage signal to the reference frequency and the reference amplitude is performed once the synchronized voltage signal is outputted. The reference frequency and the reference amplitude may be provided in advance. Alternatively, the reference frequency and the reference amplitude can be provided by a control command received from an energy management system (EMS) that manages the microgrid 1M. FIG. 5 illustrates an example of a system configuration for this case.

FIG. 5 illustrates an example of a system configuration in which the power source apparatuses 31A to 31D communicate with the EMS 10. The power source apparatuses 31A to 31D include communicators 9A, 9B, 9C, and 9D that communicate with the EMS 10 by wire or wirelessly, respectively. The EMS 10 may be a micro EMS that manages the microgrid 1M or an EMS having a hierarchical architecture including a micro EMS and an upper EMS that manages a plurality of microgrids 1M. Alternatively, in addition to the micro EMS and the upper EMS, the EMS 10 may include a system of a further upper central feed command room. The communicators 9A to 9D receive a control command indicating at least one of the reference frequency and the reference amplitude from the EMS 10.

[Control after Adjustment to Reference Frequency and Reference Amplitude]

After the voltage signal outputted from the inverter circuit 104 is adjusted to the reference frequency and the reference amplitude, the controller 100 may be instructed to further change the frequency and the amplitude by a control command from the EMS 10. For example, in a case where the load of the load apparatus 3 increases, at least one of the frequency of the electric power system 1 sometimes falls below the reference frequency. In this case, the EMS 10 sometimes transmits a control command for increasing the frequency to the power source apparatus 31. Inversely, for example, in a case where the load of the load apparatus 3 decreases, the frequency of the electric power system 1 sometimes exceeds the reference frequency. In this case, the EMS 10 sometimes transmits a control command for reducing the frequency to the power source apparatus 31. A frequency to be changed, instructed by the control command, corresponds to, by way of example, a fourth frequency. As for the amplitude, the EMS 10 likewise sometimes transmits a control command for increasing or reducing the amplitude. An amplitude to be changed, instructed by the control command, corresponds to a fourth amplitude. The control command indicating a change of the frequency corresponds to, by way of example, a first control command. The control command indicating a change of the amplitude corresponds to, by way of example, a second control command.

The controller 100 generates, in response to being instructed to change at least one of the frequency and the amplitude by the control command, a control signal for changing the output voltage to the frequency and amplitude instructed to change. For example, the control signal is generated at a constant rate such that the frequency and the amplitude are changed stepwise (gradually). The controller 100 provides the generated control signal to the inverter circuit 104. The inverter circuit 104 changes at least one of the frequency and the amplitude of the voltage signal to be outputted in accordance with the control signal.

The controller 100 may receive a control command that instructs the controller 100 to change at least one of the frequency and the amplitude from the EMS 10 at regular intervals irrespective of presence/absence of a change of the frequency and the amplitude. The controller 100 completes execution of the received control command before receiving a next control command. A time point at which the control command for changing the frequency is to be received corresponds to a first time point and a time point at which the control command for changing the amplitude is to be received corresponds to a second time point. For example, in a case where the above-described reference frequency and reference amplitude are received in the control command from the EMS 10, a process for changing the output of the inverter circuit 104, i.e., the voltage signal, to the reference frequency and the reference amplitude is completed before the reception of the next control command (before at least one of the first time point or the second time point). For example, a control signal is generated at a constant rate, thereby gently (in a slope) changing the frequency and the amplitude before the reception of the next control command.

Figure 6:
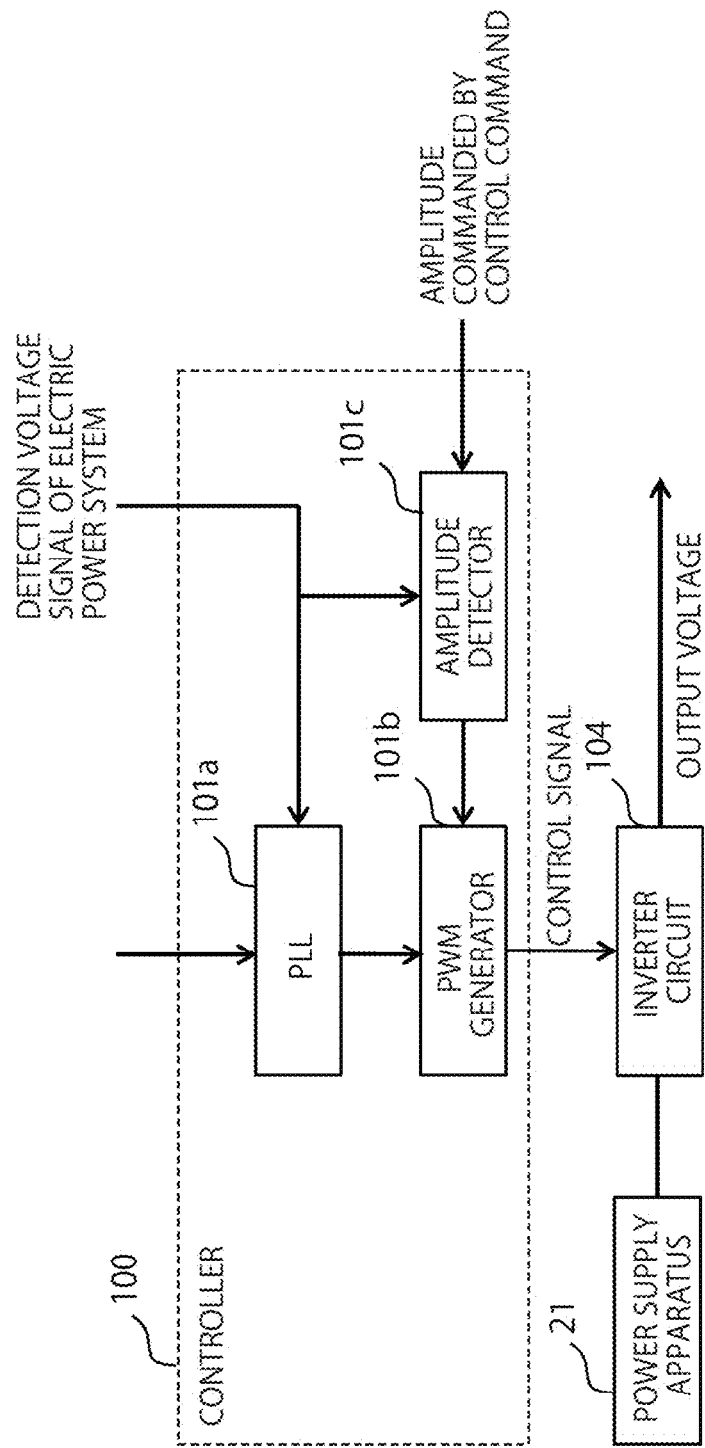
FIG. 6 illustrates an example of the configuration of the controller that changes frequency and amplitude after synchronous connection of a voltage control inverter.

FIG. 6 illustrates an example of the configuration of the controller 100 that performs a process for changing the frequency and the amplitude after synchronous connection of the voltage control inverter. The PLL 101a outputs a command signal for causing, on the basis of a difference between a frequency indicated by the control command and the frequency of a detected voltage of the electric power system, the difference to be zero or reduced (causing the frequency of the electric power system to match or be close to the frequency indicated by the control command) to the PWM generator 101b. The amplitude synchronization circuit 101c outputs a command signal for causing, on the basis of a difference between an amplitude indicated by the control command and the amplitude of the voltage of the electric power system, the difference to be zero or reduced (causing the amplitude of the voltage of the electric power system to match or be close to the amplitude indicated by the control command) to the PWM generator 101b. The controller 100 generates a control signal in accordance with these command signals and supplies the control signal to the inverter circuit 104. The frequency indicated by the control command may be the reference frequency or any other frequency. The amplitude indicated by the control command may be the reference amplitude or any other amplitude. In a case where the reference frequency and the reference amplitude are provided not in the EMS 10 but in the voltage control inverter in advance, it is only necessary to read values indicating the reference frequency and the reference amplitude from a memory in the voltage control inverter.

Figure 7:
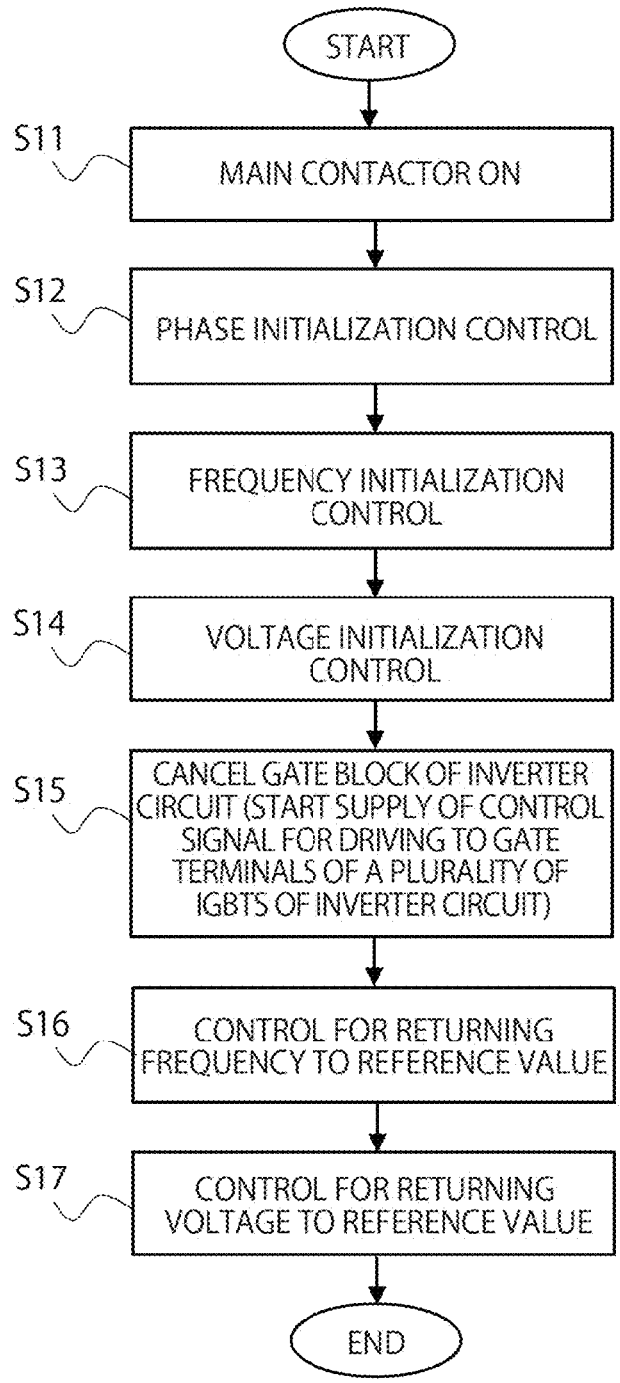
FIG. 7 is a flowchart illustrating an example of an operation of a voltage control inverter according to the present embodiment.

FIG. 7 is a flowchart illustrating an example of an operation of the voltage control inverter 11 according to the present embodiment. The order of steps in this flowchart is merely an example. The steps may be partly changed in order or may be partly simultaneously performed in parallel. Further, a part of the steps may be absent. For example, one or both of Step S13 and Step S14 may be omitted.

The premise is that the power source apparatus 31 is disconnected from the electric power system 1 (or the microgrid M1), that is, the inverter circuit 104 is out of operation. In response to receiving an instruction command (a control command) to synchronously connect the power source apparatus 31 to the electric power system 1 from, for example, a maintenance person or the EMS 10, the controller 100 of the power source apparatus 31 turns on the main contactor 103, causing the inverter circuit 104 to be connected to the electric power system 1 (S11). However, the inverter circuit 104 is in a gate block state at this point of time. It should be noted that the electric power system 1 is in normal operation with the breaker 2 turned on.

The controller 100 receives a voltage signal from the voltage sensor 101 at regular sampling intervals. The phase and frequency of the electric power system 1 are determined on the basis of the detected voltage signal. The controller 100 generates the first command signal including an instruction to set the phase and frequency of the output voltage of the inverter circuit 104 at the phase and frequency of the voltage of the electric power system (S12, S13). The initialization setting of the phase and the frequency is thus achieved.

The amplitude synchronization circuit (amplitude detector or amplitude detecting circuit) 101c of the controller 100 detects the amplitude of the voltage of the electric power system 1 and generates the third command signal including an instruction to set the amplitude of the output voltage of the inverter circuit 104 at the amplitude of the voltage of the electric power system 1 (S14). The initialization setting of the amplitude is thus achieved.

The controller 100 supplies the generated control signals to the gate terminals of the plurality of switching devices (e.g., IGBTs) of the inverter circuit 104 (S15). The gate block state of the inverter circuit 104 is cancelled and a voltage signal synchronized in phase, frequency, and amplitude with the voltage of the electric power system 1 is outputted from the inverter circuit 104.

In connecting the power source apparatus 31 to the electric power system 1, for example, a phase difference is zero, a voltage difference is zero, and a frequency difference is also zero by virtue of the control in the above-described Steps S11 to S15, so that a difference of an output power from the inverter circuit 104 is also zero. This makes it possible to reduce the occurrence of high current and safely connect (synchronously connect) the power source apparatus 31 to the electric power system 1. In a case where the phase difference is zero, the voltage difference is zero, and the frequency difference is also zero, an active output power from the voltage control inverter 11 is also zero.

After the power source apparatus 31 is synchronously connected to the electric power system 1, the controller 100 performs a control to return the frequency of the output voltage of the inverter circuit 104 to the reference frequency (for example, 50 Hz or 60 Hz) (S16). In addition, the controller 100 performs a control to return the amplitude of the output voltage of the inverter circuit 104 to the reference amplitude (S17). After this, the controller 100 receives a control command from the EMS 10 at, for example, regular time intervals and controls the frequency and amplitude of the output voltage of the inverter circuit 104 on the basis of the received control command.

Figure 8:
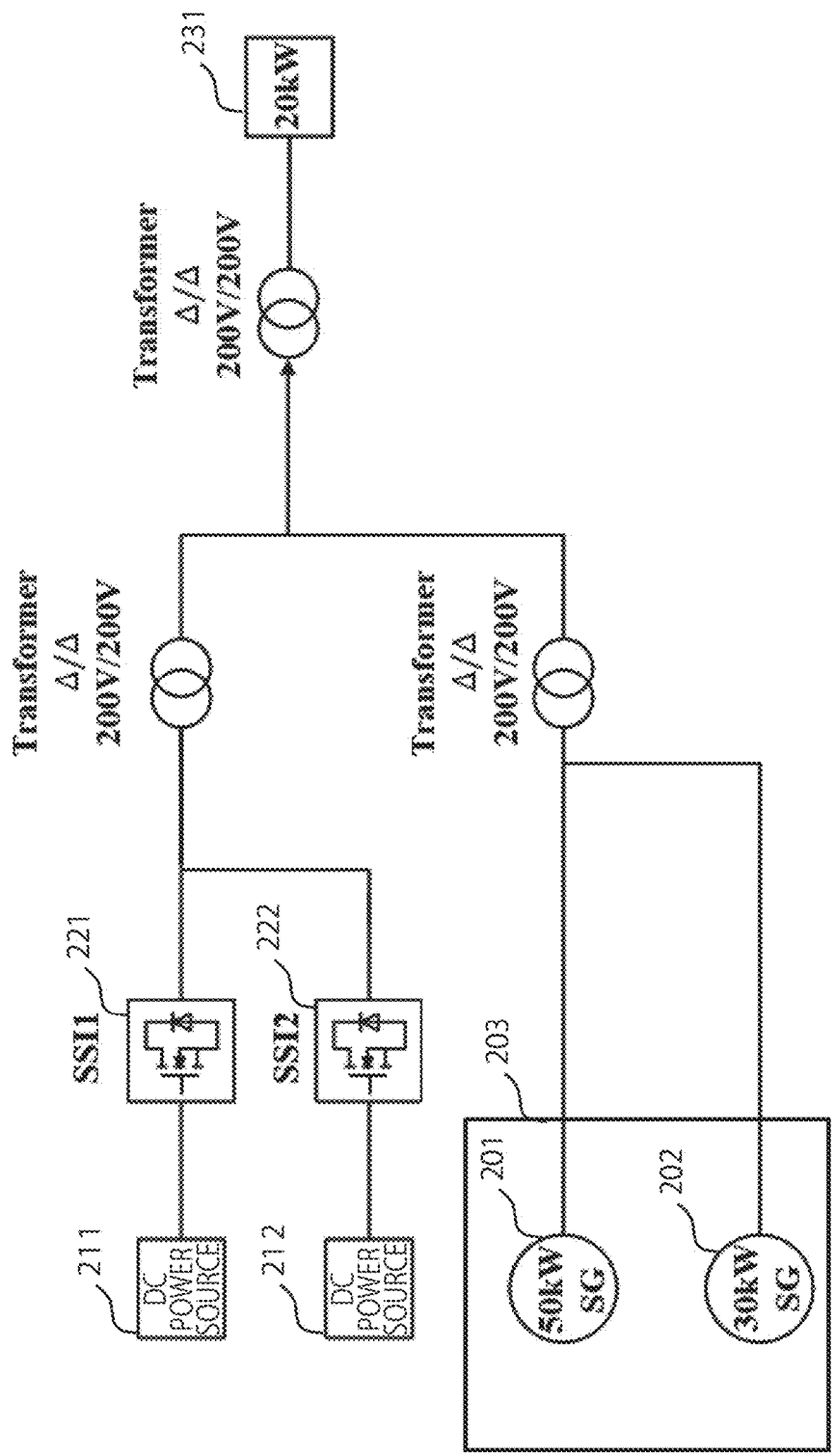
FIG. 8 illustrates a model used for simulation according to the present embodiment.

Description will be made on a result of simulation of synchronous connection of the voltage control inverter of the present embodiment. FIG. 8 is a model (a synchronous connection model) used for the simulation. In this example, two power generators 201 and 202 are provided. The power generators 201 and 202 are collectively referred to as an electric power system 203. Further, DC (Direct Current) apparatuses 211 and 212 are provided as power supply apparatuses, being connected to voltage control inverters 221 and 222 according to the present embodiment, respectively. The voltage control inverters 221 and 222 and the electric power system 203 (the power generators 201 and 202) are connected in parallel to a load apparatus 231. It should be noted that a transformer 241 in common is disposed on an output side of the voltage control inverters 221 and 222, a transformer 251 in common is disposed on an output side of the electric power system 203 (the power generators 201 and 201), and a transformer 261 is disposed on an input side of the load apparatus 231. It is assumed that the power generators 201 and 202 are synchronously in operation or only either one of them is in operation. It is assumed that both the voltage control inverter 221 and 222 is stopped and only one of them (here, only the voltage control inverter 221) is to be synchronously connected.

Figure 9:
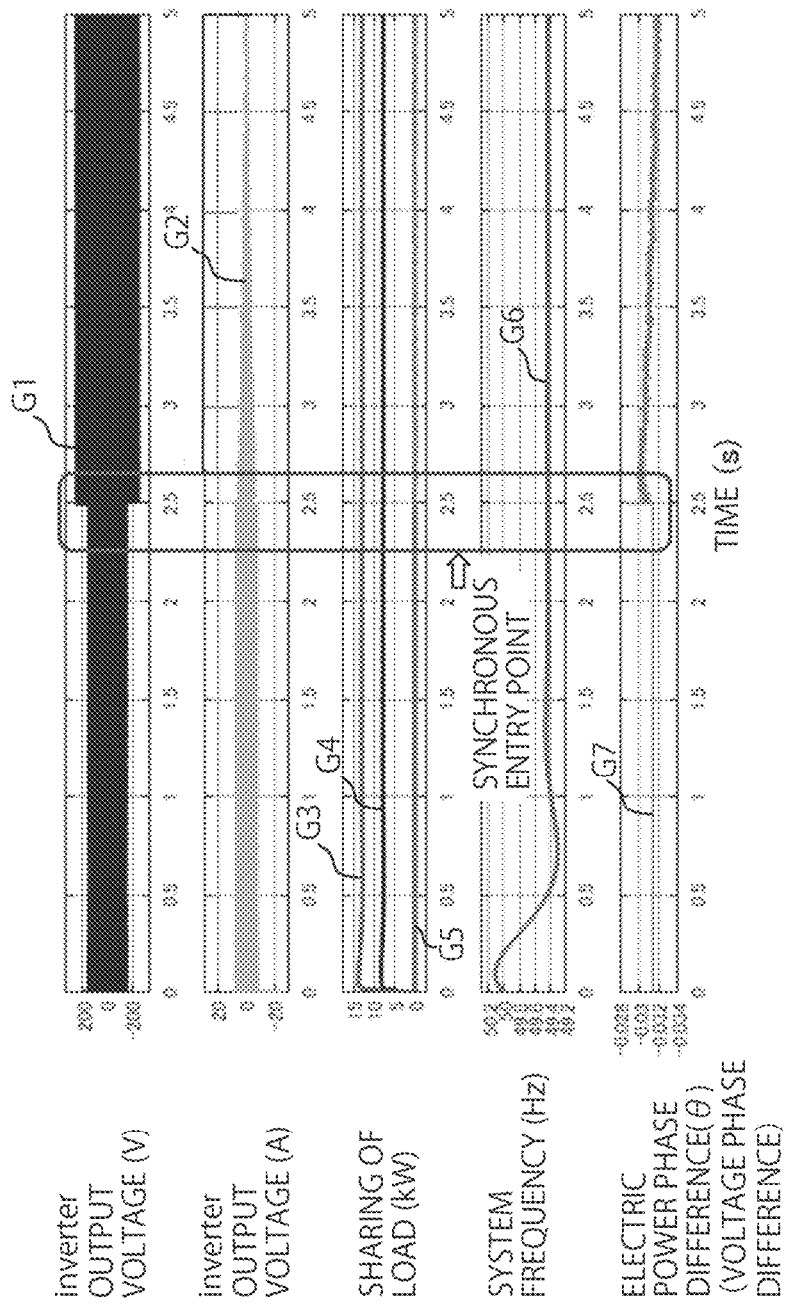
FIG. 9 illustrates a graph showing a result of the simulation.

FIG. 9 is a graph illustrating the result of this simulation.

Figure 10:
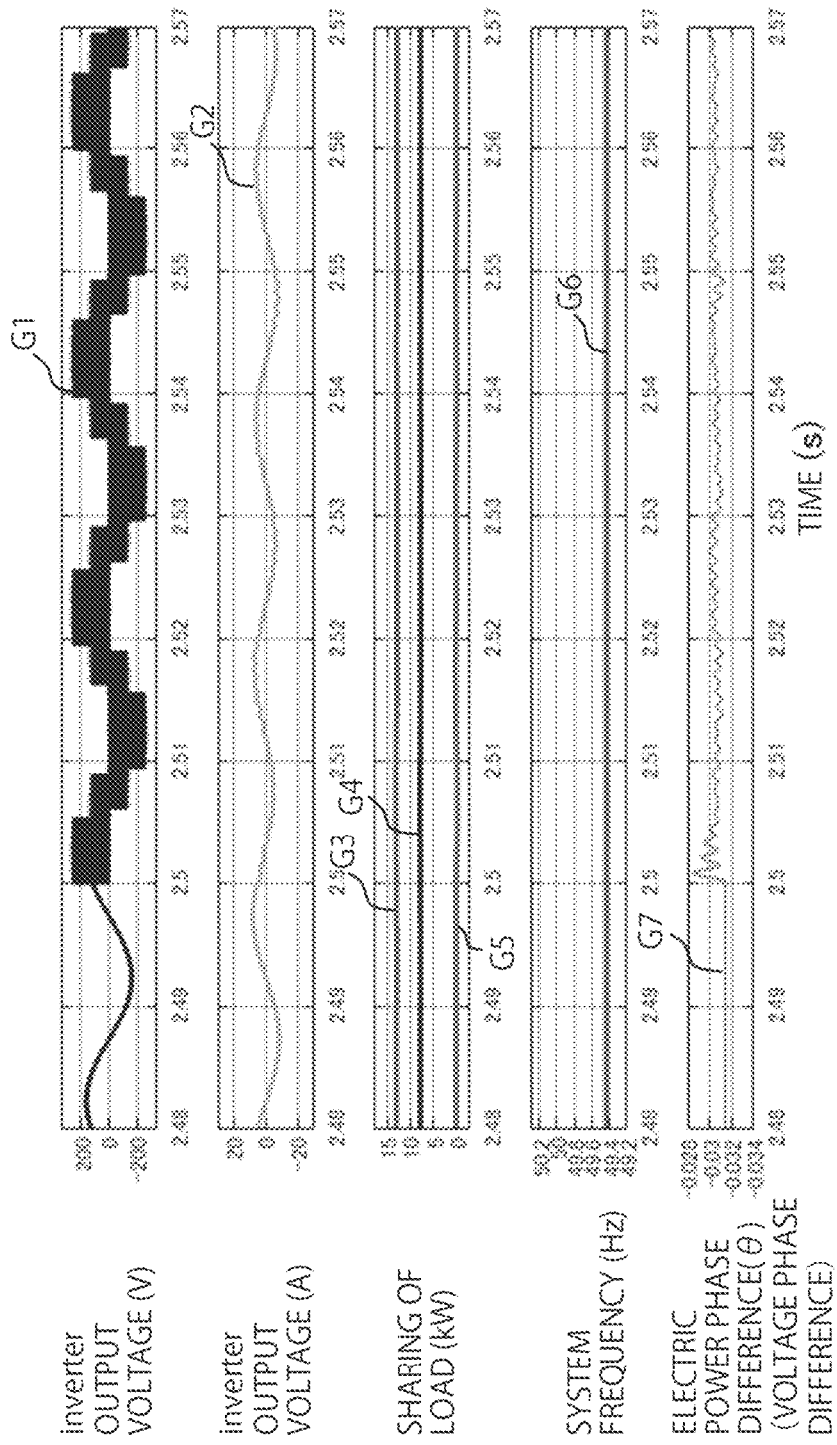
FIG. 10 illustrates a part of the graph in FIG. 9 in an enlarged scale.

FIG. 10 illustrates, within the graph in FIG. 9, a part at and around a time (2.5(s)) when the voltage control inverter 221 becomes synchronously connected in an enlarged scale.

A graph G1 illustrates a voltage at an output end of the voltage control inverter 221 (the voltage of the electric power system 203) and a graph G2 illustrates a current at the output end of the voltage control inverter 221. A graph G3 illustrates a variation in load of the load apparatus 231, a graph G4 illustrates the output voltage of the electric power system 203, and a graph G5 illustrates the active output power of the voltage control inverter 221. A graph G6 illustrates the frequency of the electric power system 203 (a bus). A graph G7 illustrates a phase difference (a voltage phase difference or an electric power phase difference) between the voltage of the electric power system 203 and the output voltage of the voltage control inverter 221.

In this simulation, the voltage control inverter 221 is synchronously connected to the electric power system 203 at the time 2.5 with all the phase, frequency, and amplitude synchronized. After the synchronous connection, the control for returning the frequency and the amplitude to the reference frequency and the reference amplitude is not performed. All the phase, frequency, and amplitude have matched or substantially matched the phase, frequency, and amplitude of the electric power system 203 (the power generators 201 and 202) since the time of the synchronous connection, so that the active output power of the voltage control inverter 221 is zero (the sharing of load of the voltage control inverter 221 is zero) after the synchronous connection. In the graph G1, an output voltage (a rectangular wave) from the voltage control inverter 221 is applied after the synchronous entry and the output voltage is a rectangular wave. In contrast, the voltage of the electric power system 203 is a sinusoidal wave before the synchronous entry. An image of application of the rectangular wave to the sinusoidal wave is reflected in the form of the graph appearing after the time 2.5. The output active power of the voltage control inverter 221 before and after the synchronous connection is zero (see the graph G5). Further, a switch in the voltage control inverter 221 has been turned on since before the start of the synchronous connection, so that a voltage is detected by the voltage sensor 101 (see the graph G1) and a current is detected by the current sensor 102 (see the graph G2). As is understood from the graph G2, no current spike (overcurrent) occurs at the moment of the synchronous connection.

Figure 11:
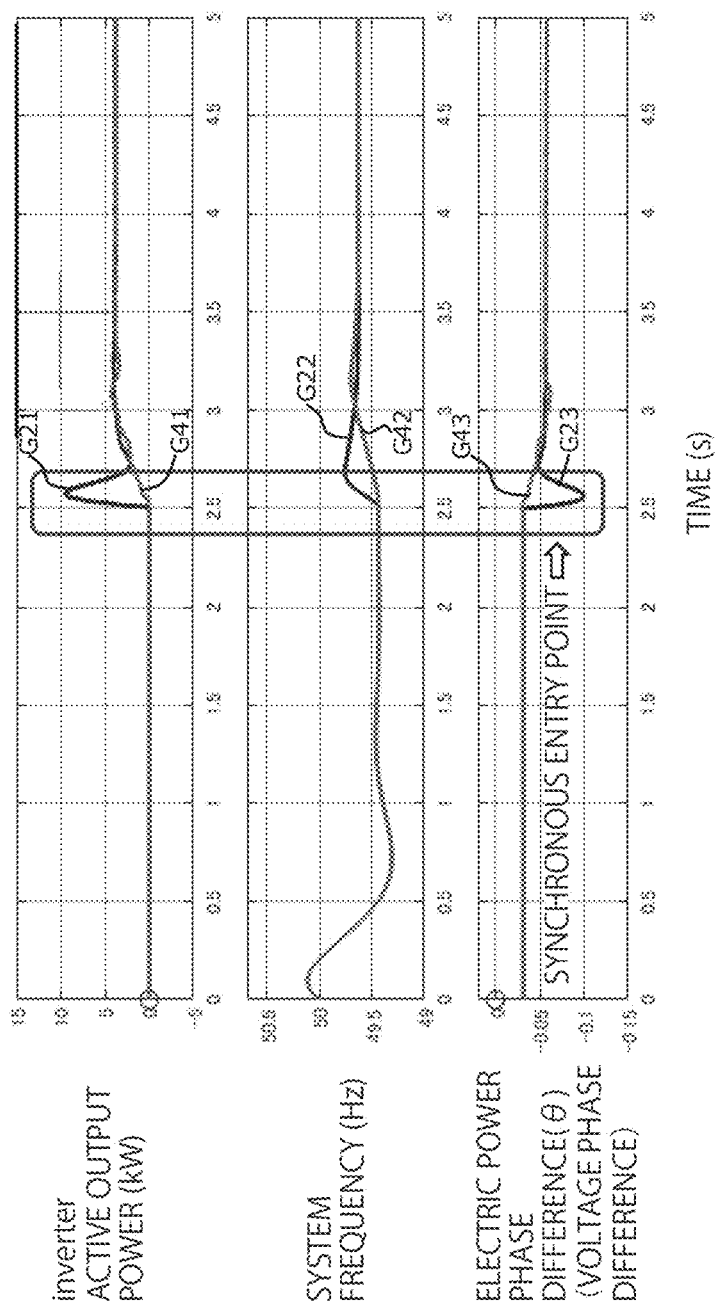
FIG. 11 illustrates another example of the graph showing the result of the simulation.

FIG. 11 illustrates, as a result of this simulation, a case where the frequency is gradually returned to the reference frequency after the synchronous connection. There are provided graphs G21 and G41 regarding the active output power of the voltage control inverter 221, graphs G22 and G42 regarding the frequency of the electric power system 203 (a bus frequency), and graphs G23 and G43 regarding a voltage phase difference (an electric power phase difference). The graphs G21, G22, and G23 illustrate a case where the voltage control inverter 221 becomes synchronously connected at the time 2.5 with only the phase synchronized and neither the frequency nor the voltage amplitude synchronized and the frequency is gradually returned to the reference frequency after the connection. The graph G41, G42, and G43 illustrate a case where the voltage control inverter 221 becomes synchronously connected at the time 2.5 with the phase, the frequency, and the amplitude synchronized and the frequency is gradually returned to the reference frequency after the connection. In either case, the synchronous connection is completed after the elapse of approximately 0.6 (s) since the time 2.5 when the synchronous connection is performed and the output frequency of the voltage control inverter 221 matches the reference frequency.

In a case where only the phase is synchronized, the frequency is not synchronized (see the graph G22), so that a phase difference is zero at the moment of the synchronous connection but, immediately after that, the phase difference becomes slightly larger as illustrated in the graph G23. Further, as illustrated in the graph G21, a small spike (overcurrent) occurs in the active output power of the voltage control inverter 221. However, this spike is sufficiently small as compared with a case where the voltage control inverter 221 is connected with the phase not synchronized, so that the occurrence of this overcurrent is not supposed to impair the advantage of the present embodiment.

In contrast, in a case where the voltage control inverter 221 is connected with the phase, frequency, and amplitude synchronized, a phase difference is small at the moment of and after the synchronous connection as illustrated in the graph G43. Further, no small spike (overcurrent) occurs in the active output power of the voltage control inverter 221 as illustrated in the graph G41.

Therefore, the present embodiment makes it possible to synchronize, in connecting the voltage control inverter to the electric power system, at least one of the phase, the frequency, and the amplitude with that of the electric power system, which enables reducing the occurrence of overcurrent. Further, during the process for synchronous connection, the switch (the main contactor) is turned on, which eliminates the necessity of disposing a sensor for voltage detection on an inverter-circuit side of the switch.

Further, according to the present embodiment, in connecting the voltage control inverter to the electric power system, the amplitude is synchronized with that of the electric power system. This makes it possible to cause the voltage control inverter to start running with a difference in voltage from the electric power system starting from zero (or a significantly small value), so that no reactive overcurrent occurs. Further, after the start of the synchronous running, a voltage command value (the third command signal) to the PWM generator is gradually (in a slope) returned toward the reference voltage, which makes it possible to start sharing of load without the occurrence of overcurrent.

Practical Application Examples

Examples of the case where the power source apparatus 31 goes out of operation in the above-described present embodiment may include a case where the supply of an electric power from the power supply apparatus 21 is stopped in addition to a case where the electric power system 1 has a power outage or the like. For example, no sunlight may be applied to the solar power generator 21B, which is a power supply apparatus, causing the output of a generated power from the solar power generator 21B to be stopped. In this case, the voltage control inverter 11 of the power source apparatus 31 also goes out of operation. In a case where the output of the generated power is started with the start of exposure to sunlight, the voltage control inverter 11 can be connected without the occurrence of overcurrent or the like by synchronously connecting the voltage control inverter 11 according to the above-described present embodiment. The controller 100 of the voltage control inverter 11 may monitor a power generation condition of the solar power generator 21B and stops, in response to the stop of power generation, the operation of the voltage control inverter 11 and turn off the switch 103. Further, in response to detecting the start of power generation, the controller 100 may turn on the switch 103 and perform the operations (the process for synchronous connection) in the above-described flowchart.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A voltage control inverter interconnectable with an electric power system, comprising:
   a voltage detecting circuit configured to detect a first voltage that is a voltage of the electric power system; and
   a voltage output circuit configured to output a second voltage to the electric power system at a timing depending on a value of the first voltage, the second voltage having a value depending on the value of the first voltage.

2. The voltage control inverter according to claim 1, further comprising a control circuit configured to generate a first control signal comprising an instruction to output the second voltage, wherein
   the voltage output circuit is configured to output the second voltage to the electric power system based on the first control signal.

3. The voltage control inverter according to claim 2, wherein the voltage output circuit is a switching device configured to receive the first control signal at a control terminal and perform an operation depending on the first control signal.

4. The voltage control inverter according to claim 2, further comprising a switch configured to couple the voltage output circuit to the electric power system, wherein
   the control circuit is configured to generate the control signal with the switch turned on.

5. The voltage control inverter according to claim 1, wherein the timing is a timing which the first voltage crosses a voltage for reference at which a phase of the first voltage is inverted.

6. The voltage control inverter according to claim 5, wherein a value of the voltage for reference is 0 [V].

7. The voltage control inverter according to claim 1, further comprising a frequency detecting circuit configured to detect a first frequency that is a frequency of the first voltage, wherein
   the voltage output circuit is configured to output the second voltage with a second frequency depending on the first frequency.

8. The voltage control inverter according to claim 7, further comprising a control circuit configured to change an active power of the voltage control inverter from zero to a first value in a slope.

9. The voltage control inverter according to claim 7, wherein after the voltage output circuit outputs the second voltage with the second frequency, a frequency of the second voltage is varied in a slope to a third frequency different from the first frequency.

10. The voltage control inverter according to claim 9, further comprising a receiver configured to receive, at a first time point, a first control command comprising an instruction to change the frequency of the second voltage to a fourth frequency from an energy management system of the electric power system, wherein
    the voltage control circuit is configured to end a process to change the frequency of the second voltage to the third frequency before the first time point.

11. The voltage control inverter according to claim 9, wherein after the voltage output circuit outputs the second voltage with the third frequency, the frequency of the second voltage is kept at the third frequency.

12. The voltage control inverter according to claim 7, wherein after the voltage output circuit outputs the second voltage, a frequency of the second voltage is kept at the second frequency.

13. The voltage control inverter according to claim 1, further comprising an amplitude detecting circuit configured to detect a first amplitude that is an amplitude of the first voltage, wherein
    the voltage output circuit is configured to output the second voltage with a second amplitude depending on the first amplitude.

14. The voltage control inverter according to claim 13, further comprising a control circuit configured to change an active power command value of the voltage control inverter from zero to a first value in a slope.

15. The voltage control inverter according to claim 13, wherein after the voltage output circuit outputs the second voltage with the second amplitude, an amplitude of the second voltage is varied in a slope to a third amplitude different from the first amplitude.

16. The voltage control inverter according to claim 15, further comprising a receiver configured to receive, at a second time point, a second control command comprising an instruction to change the amplitude of the second voltage to a fourth amplitude from an energy management system of the electric power system, wherein
    the voltage control circuit is configured to end a process to change the amplitude of the second voltage to the third amplitude before the second time point.

17. The voltage control inverter according to claim 15, wherein after the voltage output circuit outputs the second voltage with the third amplitude, the amplitude of the second voltage is kept at the third amplitude.

18. The voltage control inverter according to claim 13, wherein after the voltage output circuit outputs the second voltage, an amplitude of the second voltage is kept at the second amplitude.

19. A power source apparatus comprising:
a voltage control inverter interconnectable with an electric power system; and
a natural energy power generator, wherein
the voltage control inverter comprises:
a voltage detecting circuit configured to detect a first voltage that is a voltage of the electric power system; and
a voltage output circuit configured to output, based on an electric power generated by the natural energy power generator, a second voltage to the electric power system at a timing depending on a value of the first voltage, the second voltage having a value depending on the value of the first voltage.

20. The power source apparatus according to claim 19, further comprising a control circuit configured to start, in response to detecting that the natural energy power generator starts generating the electric power, an operation of the voltage output circuit.

21. A control method performed by a voltage control inverter interconnectable with an electric power system, comprising:
detecting a first voltage that is a voltage of the electric power system; and
outputting a second voltage to the electric power system at a timing depending on a value of the first voltage, the second voltage having a value depending on the value of the first voltage.

22. A control method performed by a voltage control inverter interconnectable with an electric power system, the voltage control inverter operating based on power generated by a natural energy power generator comprising:
detecting a first voltage that is a voltage of the electric power system; and
outputting a second voltage to the electric power system at a timing depending on a value of the first voltage, the second voltage having a value depending on the value of the first voltage.

23. The method according to claim 22, comprising:
starting an operation to output the second voltage in accordance with a timing which starting power generation by the natural energy power generator is detected.

\* \* \* \* \*